United States Patent
Kawai et al.

(10) Patent No.: US 12,022,826 B2
(45) Date of Patent: Jul. 2, 2024

(54) PLANT IMMUNITY INDUCTION METHOD AND PLANT IMMUNITY INDUCTION AGENT

(71) Applicant: Panasonic Intellectual Property Management Co., Ltd., Osaka (JP)

(72) Inventors: Shikiho Kawai, Hyogo (JP); Junko Muraoka, Kyoto (JP); Kosuke Nakajima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 764 days.

(21) Appl. No.: 17/071,548

(22) Filed: Oct. 15, 2020

(65) Prior Publication Data

US 2021/0068390 A1 Mar. 11, 2021

Related U.S. Application Data

(63) Continuation of application No. PCT/JP2019/015051, filed on Apr. 5, 2019.

(30) Foreign Application Priority Data

May 22, 2018 (JP) .................................. 2018-097654

(51) Int. Cl.
  *A01N 25/16* (2006.01)
  *A01G 7/06* (2006.01)
  *A01N 35/02* (2006.01)

(52) U.S. Cl.
  CPC ............... *A01N 25/16* (2013.01); *A01G 7/06* (2013.01); *A01N 35/02* (2013.01)

(58) Field of Classification Search
  CPC ........... A01N 25/16; A01N 35/02; A01G 7/06
  See application file for complete search history.

(56) References Cited

U.S. PATENT DOCUMENTS

2019/0329199 A1   10/2019   Sugano et al.

FOREIGN PATENT DOCUMENTS

| JP | 2005-041782 | 2/2005 |
| JP | 2014-171463 | 9/2014 |
| WO | 2018/097019 | 5/2018 |

OTHER PUBLICATIONS

Daum (Eur. J. Lipid Sci. Technol. Published 2011, pp. 1-22). (Year: 2011).*
English Translation of Chinese Search Report dated Jul. 22, 2021 for the related Chinese Patent Application No. 201980032321.0.
Yong Ben, "Special Concrete Design and Construction(Partial English Translation)", China Architecture and Building Press, Sep. 30, 1993, first edition, p. 447.
International Search Report of PCT application No. PCT/JP2019/015051 dated Jun. 25, 2019.

* cited by examiner

*Primary Examiner* — Alma Pipic
(74) *Attorney, Agent, or Firm* — Rimon P.C.

(57) ABSTRACT

Provided is a method for inducing immunity of a plant using ultra fine bubble water containing a short-chain aldehyde. The plant immunity induction method according to the present disclosure comprises exposing a plant to ultra fine bubble water containing a short-chain aldehyde and an oily substance. In the ultra fine bubble water, ultra fine bubbles are dispersed in water. The life of the ultra fine bubbles in the ultra fine bubble water tends to be prolonged due to the function of the oily substance. As a result, the short-chain aldehyde is allowed to be stably present around the plant, and therefore plant immunity can be induced easily.

5 Claims, 2 Drawing Sheets

Specification includes a Sequence Listing.

SEQUENCE LISTING

<160> NUMBER OF SEQ ID NOS: 14

<210> SEQ ID NO 1
<211> LENGTH: 21
<212> TYPE: DNA
<213> ORGANISM: Artificial Sequence
<220> FEATURE:
<223> OTHER INFORMATION: Synthesized Primer

<400> SEQUENCE: 1
ggtggtgtgg cgtaactcgg t                                           21

<210> SEQ ID NO 2
<211> LENGTH: 25
<212> TYPE: DNA
<213> ORGANISM: Artificial Sequence
<220> FEATURE:
<223> OTHER INFORMATION: Synthesized Primer

<400> SEQUENCE: 2
caccatatgg acgttgtcct ctcca                                       25

<210> SEQ ID NO 3
<211> LENGTH: 20
<212> TYPE: DNA
<213> ORGANISM: Artificial Sequence

```
<220> FEATURE:
<223> OTHER INFORMATION: Synthesized Primer

<400> SEQUENCE: 3
tcactcattc catggctcgt                                                     20

<210> SEQ ID NO 4
<211> LENGTH: 25
<212> TYPE: DNA
<213> ORGANISM: Artificial Sequence
<220> FEATURE:
<223> OTHER INFORMATION: Synthesized Primer

<400> SEQUENCE: 4
tctacctcat aggtaacaaa gagca                                               25

<210> SEQ ID NO 5
<211> LENGTH: 24
<212> TYPE: DNA
<213> ORGANISM: Artificial Sequence
<220> FEATURE:
<223> OTHER INFORMATION: Synthesized Primer

<400> SEQUENCE: 5
cgcctcaaat agtcaactga tctc                                                24

<210> SEQ ID NO 6
<211> LENGTH: 25
<212> TYPE: DNA
<213> ORGANISM: Artificial Sequence
<220> FEATURE:
<223> OTHER INFORMATION: Synthesized Primer

<400> SEQUENCE: 6
tgagatgtaa ctcttattcc ggtct                                               25

<210> SEQ ID NO 7
<211> LENGTH: 20
<212> TYPE: DNA
<213> ORGANISM: Artificial Sequence
<220> FEATURE:
<223> OTHER INFORMATION: Synthesized Primer

<400> SEQUENCE: 7
ccgctcccaa cgctcactgg                                                     20

<210> SEQ ID NO 8
<211> LENGTH: 20
<212> TYPE: DNA
<213> ORGANISM: Artificial Sequence
<220> FEATURE:
<223> OTHER INFORMATION: Synthesized Primer

<400> SEQUENCE: 8
ggcaccaccg agtccatcgc                                                     20

<210> SEQ ID NO 9
<211> LENGTH: 24
<212> TYPE: DNA
<213> ORGANISM: Artificial Sequence
<220> FEATURE:
<223> OTHER INFORMATION: Synthesized Primer

<400> SEQUENCE: 9
gcgcggaaga tgctgcttta gctt                                                24
```

```
<210> SEQ ID NO 10
<211> LENGTH: 20
<212> TYPE: DNA
<213> ORGANISM: Artificial Sequence
<220> FEATURE:
<223> OTHER INFORMATION: Synthesized Primer

<400> SEQUENCE: 10
gcgccactac aggggagcaa                                               20

<210> SEQ ID NO 11
<211> LENGTH: 21
<212> TYPE: DNA
<213> ORGANISM: Artificial Sequence
<220> FEATURE:
<223> OTHER INFORMATION: Synthesized Primer

<400> SEQUENCE: 11
caaagttggt ggttttgggc t                                             21

<210> SEQ ID NO 12
<211> LENGTH: 20
<212> TYPE: DNA
<213> ORGANISM: Artificial Sequence
<220> FEATURE:
<223> OTHER INFORMATION: Synthesized Primer

<400> SEQUENCE: 12
ccaacctcta ccagcaccat                                               20

<210> SEQ ID NO 13
<211> LENGTH: 22
<212> TYPE: DNA
<213> ORGANISM: Artificial Sequence
<220> FEATURE:
<223> OTHER INFORMATION: Synthesized Primer

<400> SEQUENCE: 13
gctgctgtaa caagatggat gc                                            22

<210> SEQ ID NO 14
<211> LENGTH: 21
<212> TYPE: DNA
<213> ORGANISM: Artificial Sequence
<220> FEATURE:
<223> OTHER INFORMATION: Synthesized Primer

<400> SEQUENCE: 14
aggggatttt gtcagggttg t                                             21
```

PLANT IMMUNITY INDUCTION METHOD AND PLANT IMMUNITY INDUCTION AGENT

INCORPORATION BY REFERENCE SEQUENCE LISTING

The material contained in the ASCII text file named "P1017216US01_ST25.txt" created on Nov. 11, 2020, and having a file size of 3,013 bytes is incorporated by reference herein.

BACKGROUND

1. Technical Field

The present disclosure relates to a plant immunity induction method and a plant immunity induction agent.

2. Description of the Related Art

Conventionally, a method for helping plant growth or a method for adding additional value to a plant has been proposed.

For example, Patent Literature 1 describes a plant resistance induction method in which a plant is exposed to a predetermined plant resistance induction agent. The plant resistance induction agent is synthesized when a plant receives an external stimulus, and includes a plant-derived information transmission substance which is responsible for information transmission regarding the external stimulus. The plant-derived information transmission substance is, for example, a short-chain aldehyde, an isoprenoid, or a plant hormone. Plants are exposed to plant resistance induction agents by methods such as direct spraying, installation in the vicinity of the target plant, or use of an air conditioner in a greenhouse.

Patent Literature 2 describes a plant treatment method in which an ultra fine bubble liquid containing a predetermined substance is absorbed in a plant. The predetermined substance is a scented substance such as Japanese pepper, truffle, citron, lemon water, and black pepper.

CITATION LIST

Patent Literature

Patent Literature 1: Japanese Patent Application Publication No. 2005-41782
Patent Literature 2: Japanese Patent Application Publication No. 2014-171463

SUMMARY

Patent Literatures 1 and 2 fail to describe inducing plant immunity using ultra fine bubble water containing a short-chain aldehyde. Therefore, the present disclosure provides a method for inducing plant immunity using ultra fine bubble water containing a short-chain aldehyde.

The present disclosure provides a plant immunity induction method comprising exposing a plant to ultra fine bubble water containing a short-chain aldehyde and an oily substance.

According to the above method, the immunity of a plant can be induced using ultra fine bubble water containing a short-chain aldehyde.

Figure 1:
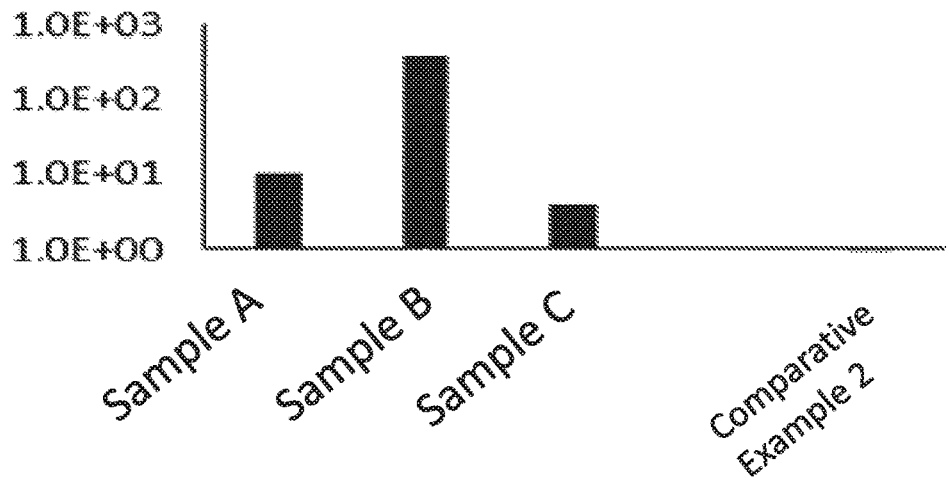
FIG. 1 is a graph showing an expression level of SlPR1 gene in samples according to the inventive examples and the comparative example.

DETAILED DESCRIPTION OF THE EMBODIMENT (Findings which have Established the Foundation of the Present Disclosure)

For example, a plant that has suffered from insect damage releases a predetermined information transmission substance. When a surrounding plant receives the information transmission substance, immunity of the plant is induced. Thus, a mechanism in which a plant transmits information using a predetermined substance is referred to as inter-plant communication. By applying this mechanism, it is conceivable that, if a plant is exposed to an information transmission substance such as short-chain aldehydes, plant immunity can be induced. For example, according to the method described in Patent Literature 1, a plant is exposed to a plant-derived information transmission substance such as a short-chain aldehyde. On the other hand, the present inventors have made a great deal of trial and error in order to develop a technique capable of stably causing a short-chain aldehyde to be present around a plant using ultra fine bubble water. As a result, the present inventors have newly found that, by including an oily substance along with the short-chain aldehyde in the ultra fine bubble water, the short-chain aldehyde is stably present around the plant, and that immunity of the plant is easily induced. The present inventors have made the method of the present disclosure based on these new findings.

(Outline of Aspect According to Present Disclosure)

The plant immunity induction method according to the first aspect of the present disclosure comprises exposing a plant to ultra fine bubble water containing a short-chain aldehyde and an oily substance.

According to the first aspect, life of ultra fine bubbles in the ultra fine bubble water tends to be made long due to a function of the oily substance. As a result, the short-chain aldehyde can be stably present around the plant, and plant immunity is easily induced.

In the second aspect of the present disclosure, in the method according to the first aspect, the short-chain aldehyde may include at least one selected from (E)-2-hexenal and (Z)-3-hexenal. According to the second aspect, the plant immunity is easily induced more reliably.

In the third aspect of the present disclosure, in the method according to the first aspect or the second aspect, the oily substance may be naturally derived. According to the third aspect, since the oily substance contained in the ultra fine bubble water is naturally derived, even if the plant is brought into contact with the oily substance contained in the ultra fine bubble water, the plant is less likely to be damaged.

In the fourth aspect of the present disclosure, in the method according to the third aspect, the oily substance may include squalene. According to the fourth aspect, the short-chain aldehyde can be stably present more reliably around the plant due to a function of the squalene.

In the fifth aspect of the present disclosure, in the method according to the third aspect, the oily substance may include oleic acid. According to the fifth aspect, the short-chain aldehyde can be stably present more reliably around the plant due to a function of the oleic acid.

In the sixth aspect of the present disclosure, in the method according to any one of the first to fifth aspects, a concentration of the short-chain aldehyde in the ultra fine bubble water may be not less than 1 µmol/liter and not more than 1,000 µmol/liter. According to the sixth aspect, a desired amount of the short-chain aldehyde can be stably present around the plant.

In the seventh aspect of the present disclosure, in the method according to any one of the first to sixth aspects, at least a part of the plant may be immersed in the ultra fine bubble water. According to the sixth aspect, the short-chain aldehyde can be stably present at a high concentration around the plant.

According to the eighth aspect of the present disclosure, in the method according to the seventh aspect, a root of the plant may be immersed in the ultra fine bubble water. According to the eighth aspect, the short-chain aldehyde is absorbed from the roots of the plant, so that the short-chain aldehyde is easily carried throughout the plant. As a result, immunity is easily induced in the entire of the plant.

The plant immunity induction agent according to the ninth aspect of the present disclosure comprises ultra fine bubble water, a short-chain aldehyde contained in the ultra fine bubble water, and an oily substance contained in the ultra fine bubble water. The plant immunity induction method according to the first aspect can be carried out using the plant immunity induction agent.

Embodiment

Hereinafter, an embodiment of the present disclosure will be described. The following embodiment is merely an example, and the plant immunity induction method and the plant immunity induction agent of the present disclosure are not limited to the following embodiment.

In the plant immunity induction method of the present disclosure, a plant immunity induction agent is used. The plant immunity induction agent comprises ultra fine bubble water, a short-chain aldehyde, and an oily substance. The short-chain aldehydes are contained in the ultra fine bubble water. The oily substance is contained in the ultra fine bubble water. A plant is exposed to the ultra fine bubble water containing the short-chain aldehyde and the oily substance using the plant immunity induction agent. In the present specification, the oily substance is typically a substance that has fluidity at room temperature (20° C.±15° C.: Japanese Industrial Standards JIS Z 8703) and is insoluble in water. An example of the oily substance is a substance containing squalene and a fatty acid.

Life of the ultra fine bubbles in the ultra fine bubble water tends to be prolonged due to the function of the oily substance. As a result, the short-chain aldehyde can be stably present around the plant, and the plant immunity is easily induced.

In ultra fine bubble water, ultra fine bubbles are dispersed in water. In the present specification, "ultra fine bubbles" are bubbles each having a bubble diameter of less than 1 µm in accordance with ISO 20480-1: 2017. A mode of a diameter of the bubbles in the ultra fine bubble water is, for example, less than 1,000 nm, or may be not more than 500 nm, not more than 300 nm, not more than 200 nm, not less than 50 nm and not more than 150 nm. The mode of the diameter of the bubbles in the ultra fine bubble water can be determined by, for example, a nanoparticle tracking analysis method.

A gas in the ultra fine bubbles is not limited to a specific gas, as long as the ultra fine bubbles can be formed. The gas in the ultra fine bubbles is at least one selected from the group consisting of an air, an oxygen gas, a nitrogen gas, a carbon dioxide gas, an ozone gas, a neon gas, and an argon gas, for example. The gas in the ultra fine bubbles may be an air, an oxygen gas, or a nitrogen gas. The gas in the ultra fine bubbles may be an oxygen gas.

The water as a dispersion medium in the ultra fine bubble water is, for example, tap water, purified water, ion exchange water, pure water, ultra pure water, deionized water, or distilled water.

The concentration of the ultra fine bubbles in the ultra fine bubble water is not limited to a specific concentration, as long as the plant immunity can be induced. The concentration of the ultra fine bubbles in the ultra fine bubble water is, for example, not less than $1\times10^5$/mL (milliliter), or may be not less than $1\times10^6$/mL, not less than $1\times10^7$/mL, not less than $1\times10^8$/mL, or not less than $1\times10^8$/mL and not more than $1\times10^9$/mL. The concentration of the ultra fine bubbles in the ultra fine bubble water can be determined, for example, by a nanoparticle tracking analysis method.

The ultra fine bubble water can be prepared, for example, by a known method such as a gas-liquid mixing shear method, a static mixer method, a venturi method, a cavitation method, a vapor condensation method, an ultrasonic method, a swirl flow method, a pressure dissolution method, or a micropore method.

The short-chain aldehydes typically have carbon atoms of not more than 10. The short-chain aldehyde is not particularly limited, as long as the plant immunity can be induced. The short-chain aldehydes may include an aldehyde having six carbon atoms. The short-chain aldehyde may contain at least one selected from (E)-2-hexenal and (Z)-3-hexenal. These short-chain aldehydes are often contained in a scent emitted by plants, and are likely to activate the plant immunity.

The concentration of the short-chain aldehyde in the ultra fine bubble water is not limited to a specific concentration, as long as the plant immunity can be induced. The concentration of the short-chain aldehyde in the ultra fine bubble water is not less than 1 micromol/L and not more than 1,000 micromol/L, for example. Thus, the plant immunity is easily induced.

The oily substance contained in the ultra fine bubble water is naturally derived, for example. The oily substance may be extracted or purified from animals or plants. In this case, even if the plant is brought into contact with the oily substance contained in the ultra fine bubble water, the plant is less likely to be damaged.

The fatty acid as the oily substance is, for example, a saturated fatty acid having carbon atoms of not less than 5 and not more than 12 or an unsaturated fatty acid having carbon atoms of not less than 12. The oily substance may have carbon atoms of not less than 12. The fatty acid as the oily substance may be at least one selected from the group consisting of oleic acid, octanoic acid, nonanoic acid, palmitoleic acid, linoleic acid, a-linolenic acid, and arachidonic acid. The fatty acid as the oily substance may include oleic acid. The oily substance may include squalene. These oily substances are adsorbed on the ultra fine bubbles and can be stably dispersed without agglutination in the ultra fine bubble water. As a result, the concentration of the ultra fine bubbles in the ultra fine bubble water can be maintained high. In addition, the life of the ultra fine bubbles can be extended.

The concentration of the oily substance contained in the ultra fine bubble water is not limited to a specific concentration, as long as the plant immunity can be induced. The concentration of the oily substance in the ultra fine bubble water is, for example, not less than $1 \times 10^{-3}$ ppm (parts per million) on a mass basis. As a result, the concentration of the ultra fine bubbles in the ultra fine bubble water is easy to be maintained high. The concentration of the oily substance in the ultra fine bubble water is, for example, not more than 50 ppm.

The method for exposing the plant to the ultra fine bubble water is not limited to a specific method, as long as the immunity of the plant can be induced. For example, at least a part of the plant is immersed in the ultra fine bubble water. When the plant is immersed in the ultra fine bubble water, the short-chain aldehyde is stably present at a high concentration around the plant. As a result, the plant immunity is easily induced more reliably.

A root of the plant may be immersed in the ultra fine bubble water. In this case, since the short-chain aldehyde is absorbed from the root of the plant, the short-chain aldehyde is easily transported to the whole of the plant. As a result, immunity is easily induced in the whole of the plant.

A part of the plant immersed in the ultra fine bubble water may be a part other than the root. For example, a stem, a branch, a leaf, a flower, or a fruit of the plant may be immersed in the ultra fine bubble water.

The plant may be exposed to the ultra fine bubble water by spraying the ultra fine bubble water to the plant.

The plant to which the immunity induction method of the present disclosure is applied is not limited to a specific plant. For example, the immunity induction method of the present disclosure can be applied to edible plants, ornamental plants, feed plants, or plants which are cultivated to provide industrial raw materials.

EXAMPLES

The plant immunity induction method and the plant immunity induction agent of the present disclosure will be described in more detail with reference to the examples. Note that the plant immunity induction method and the plant immunity induction agent of the present disclosure are not limited to the following examples.

Inventive Example

Water containing (E)-2-hexenal and squalene was treated using a pressure-dissolving microbubble generator to prepare ultra fine bubble water containing the (E)-2-hexenal and the squalene. Using a nanoparticle analysis system (product of NanoSight Ltd., product name: LM10) under conditions of 25° C. and 1 atm, the bubble diameter and the concentration of fine bubbles in the ultra fine bubble water were measured according to the nanoparticle tracking analysis method. According to the nanoparticle tracking analysis method, the bubble diameter and the number of the ultra fine bubbles (i.e., concentration) are calculated based on the Stokes-Einstein equation from moving speed of the fine bubbles in Brownian motion confirmed with the laser scattered light. As a result of the measurement, the mode of the diameter of the bubbles in the ultra fine bubble water was 70.3 nm.

The above ultra fine bubble water was diluted with Milli-Q water in such a manner that the concentrations of (E)-2-hexenal were 1 μM, 10 μM, and 1 mM (millimolar: $10^{-3}$ mol/dm$^3$) after conversion with an addition amount of the (E)-2-hexenal to provide immunity induction agents A, B, and C, respectively. The concentration of the ultra fine bubbles in the immunity induction agent A was $4.5\times10^5$/mL. The concentration of squalene in the immunity induction agent A was $2.9\times10^{-2}$ ppm on a mass basis.

Seeds of Micro Tom tomato were planted on a sponge moistened with water and allowed to stand in the dark at room temperature until germination thereof. After the germination, the Micro Tom tomatoes were cultivated by hydroponics using hyponica liquid fertilizer as a cultivation nutrient solution. The cultivation nutrient solution was a liquid provided by 500-fold diluting an A agent and a B agent with tap water. The Micro Tom tomatoes were cultivated for two weeks under conditions of a temperature of 20° C., a light period of 12 hours, and a dark period of 12 hours. Root parts of the 2-week-old Micro Tom tomatoes were rinsed and washed with tap water, and then, immersed in 30 mL of the immunity induction agent A, the immunity induction agent B, or the immunity induction agent C for three hours. In this way, the Micro Tom tomatoes were exposed to the immunity induction agent A, the immunity induction agent B, and the immunity induction agent C to provide a sample A, a sample B, and a sample C of the Micro Tom tomatoes, respectively.

Comparative Example 1

Water containing squalene was treated using the pressure-dissolving microbubble generator to prepare ultra fine bubble water containing the squalene. Using the nanoparticle analysis system (product of NanoSight Ltd., product name: LM10) under conditions of 25° C. and 1 atm, the bubble diameter and the concentration of fine bubbles in the ultra fine bubble water were measured according to the nanoparticle tracking analysis method. The mode of the diameter of the bubbles in the ultra fine bubble water was 98 nm.

The above ultra fine bubble water was diluted with Milli-Q water to provide an immersion liquid according to the comparative example 1. The concentration of the ultra fine bubbles in the immersion liquid according to the comparative example 1 was $2.9\times10^8$/mL. The concentration of squalene in the immersion liquid according to the comparative example 1 was 5 ppm on a mass basis.

The Micro Tom tomato was exposed in the immersion liquid according to the comparative example 1 similarly to the case of the inventive example to provide a sample of the Micro Tom tomato according to the comparative example 1, except that the immersion liquid according to the comparative example 1 was used in place of the immunity induction agent A, the immunity induction agent B, and the immunity induction agent C.

Comparative Example 2

Except for using Milli-Q water in place of the immunity induction agent A, immunity induction agent B, or immunity induction agent C, the Micro Tom tomato was exposed to the Milli-Q water similarly to the case of the inventive example to provide a sample of the Micro Tom tomato according to the comparative example 2.

Comparative Example 3

The present inventors attempted to prepare ultra fine bubble water containing (E)-2-hexenal similarly to the case of the inventive example, except that squalene was not added, and that only (E)-2-hexenal was added. However, ultra fine bubble water having a sufficient concentration of ultra fine bubbles failed to be prepared.

<Gene Expression Analysis>

Figure 2:
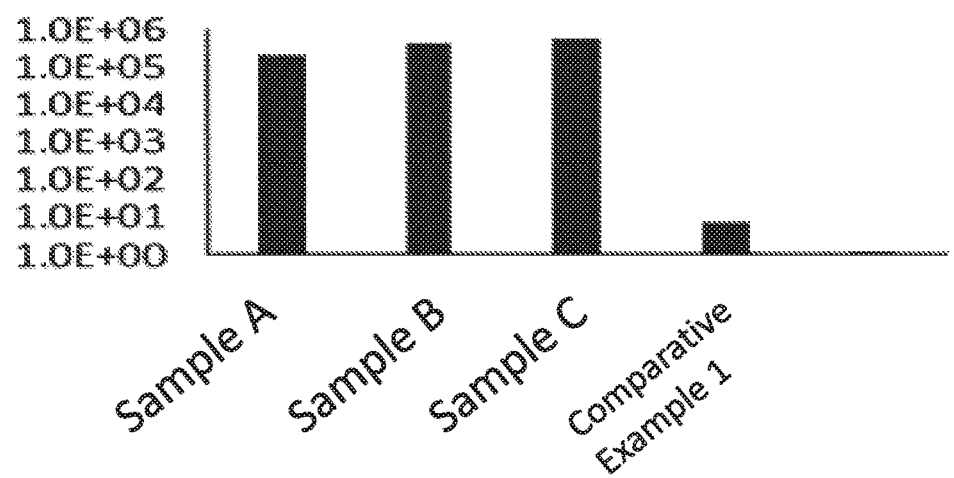
FIG. 2 is a graph showing an expression level of TPP3 gene in the samples according to the inventive examples and the comparative example.
Figure 3:
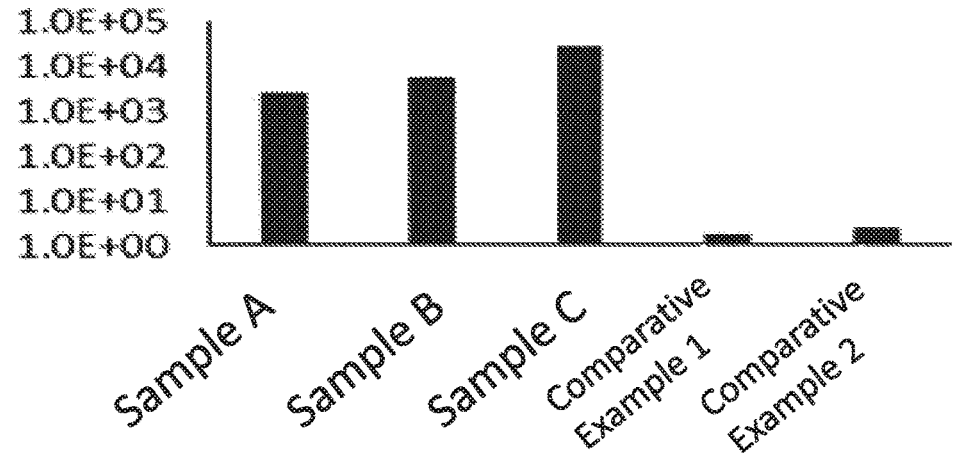
FIG. 3 is a graph showing an expression level of NP24 gene in the samples according to the inventive examples and the comparative examples.
Figure 4:
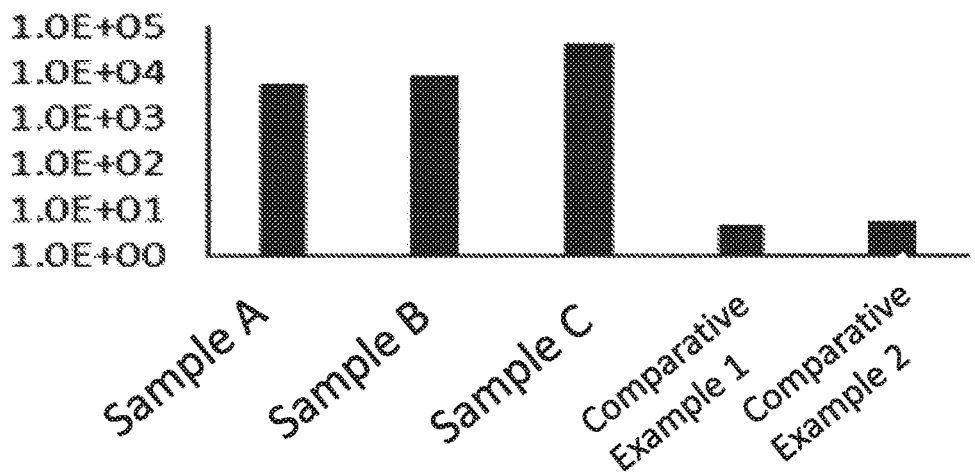
FIG. 4 is a graph showing an expression level of SlOSM gene in the samples according to the inventive examples and the comparative examples.
Figure 5:
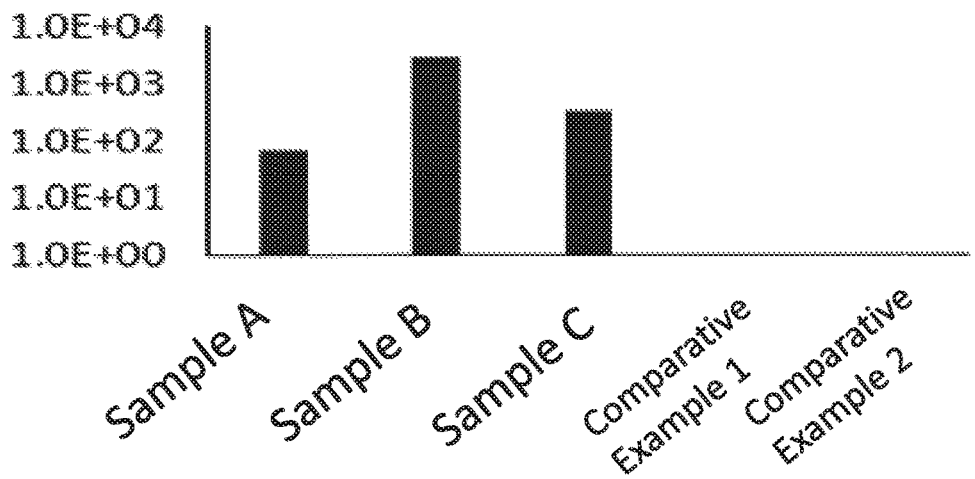
FIG. 5 is a graph showing an expression level of SlTSRF1 gene in the samples according to the inventive examples and the comparative examples.
Figure 6:
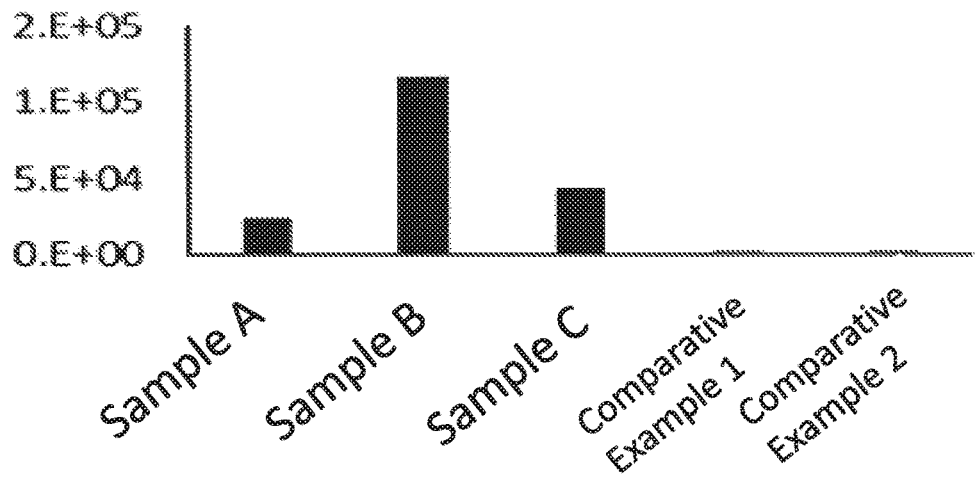
FIG. 6 is a graph showing an expression level of PR5L gene in the samples according to the inventive examples and the comparative examples.

The following treatments were performed on each of the samples A, B, and C, and the samples according to the comparative example 1 and 2. Leaves of the Micro Tom tomatoes were cut. Total RNAs were extracted using an RNA extraction kit; ISOSPIN Plant RNA (manufactured by Nippon Gene). Next, cDNA was synthesized from the total RNAs using a Transcriptor first strand cDNA synthesis kit (product of Roche Diagnostics). The operation was performed in accordance with the kit protocol. Gene expression analysis was performed using this cDNA. The target genes and gene-specific primer sequences are shown in Table 1. For primer sequences, the present inventors referenced Journal of Plants, Physiology, 2016, v. 202, pp. 107-120. A part of the primer sequences was designed using a PCR primer design tool (Primer 3). The synthesized cDNA and the primers were subjected to expression analysis using a standard protocol using Maxima SYBR Green qPCR Master Mix (2X), with separate ROX vial (product of Thermo Fisher Scientific). The used apparatus was QuantStudio 3 System (Applied Biosystems), and QuantStudio Design & Analysis software (product of Applied Biosystems) was used for the analysis. A relative value of the gene expression level was determined using EF1a as an internal standard. The results are shown in FIG. 1 to FIG. 6.

As shown in FIG. 1 to FIG. 6, expression enhancement of SIPR1, TPP3, NP24, SIOSM, SITSRF1, and PR5L genes was observed in the sample A, the sample B, and the sample C, which were immersed in the immunity induction agent A, the immunity induction agent B, and the immunity induction agent C, respectively. As just proved, the expression enhancement of six kinds of infection-relevant genes was observed in the samples in which the roots of the plants were exposed to the ultra fine bubble water containing squalene and (E)-2-hexenal. This suggests that, due to containing squalene, the ultra fine bubbles are maintained for a long time, the Micro Tom tomatoes are exposed appropriately to (E)-2-hexenal, and that, as a result, immunoactivity of the Micro Tom tomatoes is improved.

TABLE 1

| Gene | Forward Primer | Reverse Primer |
|---|---|---|
| SIPR1 | GGTGGTGTGGCGTAACTCGGT (SEQ ID NO: 01) | CACCATATGGACGTTGTCCT CTCCA (SEQ ID NO: 02) |
| TPP3 | TCACTCATTCCATGGCTCGT (SEQ ID NO: 03) | TCTACCTCATAGGTAACAAA GAGCA (SEQ ID NO: 04) |
| NP24 | CGCCTCAAATAGTCAACTGA TCTC (SEQ ID NO: 05) | TGAGATGTAACTCTTATTCC GGTCT (SEQ ID NO: 06) |
| SIOSM | CCGCTCCCAACGCTCACTGG (SEQ ID NO: 07) | GGCACCACCGAGTCCATCGC (SEQ ID NO: 08) |
| SITSRF1 | GCGCGGAAGATGCTGCTTTA GCTT (SEQ ID NO: 09) | GCGCCACTACAGGGGAGCAA (SEQ ID NO: 10) |
| PR5L | CAAAGTTGGTGGTTTTGGGC T (SEQ ID NO: 11) | CCAACCTCTACCAGCACCAT (SEQ ID NO: 12) |
| EF1a | GCTGCTGTAACAAGATGGAT GC (SEQ ID NO: 13) | AGGGGATTTTGTCAGGGTTG T (SEQ ID NO: 14) |

The invention claimed is:

1. A plant immunity induction method, comprising:
exposing a plant to ultra fine bubble water containing a short-chain aldehyde and an oily substance, wherein:
the short-chain aldehyde has carbon atoms of not more than 10, and
the oily substance includes squalene and oleic acid.

2. The method according to claim 1, wherein
the short-chain aldehyde comprises at least one selected from the group consisting of (E)-2-hexenal and (Z)-3-hexenal.

3. The method according to claim 1, wherein
a concentration of the short-chain aldehyde in the ultra fine bubble water is not less than 1 μmol/liter and not more than 1,000 μmol/liter.

4. The method according to claim 1, wherein
at least a part of the plant is immersed in the ultra fine bubble water.

5. The method according to claim 4, wherein
a root of the plant is immersed in the ultra fine bubble water.

* * * * *